No. 878,363. PATENTED FEB. 4, 1908.
J. E. DOGGWYLER.
CONCENTRATOR.
APPLICATION FILED JULY 10, 1906.
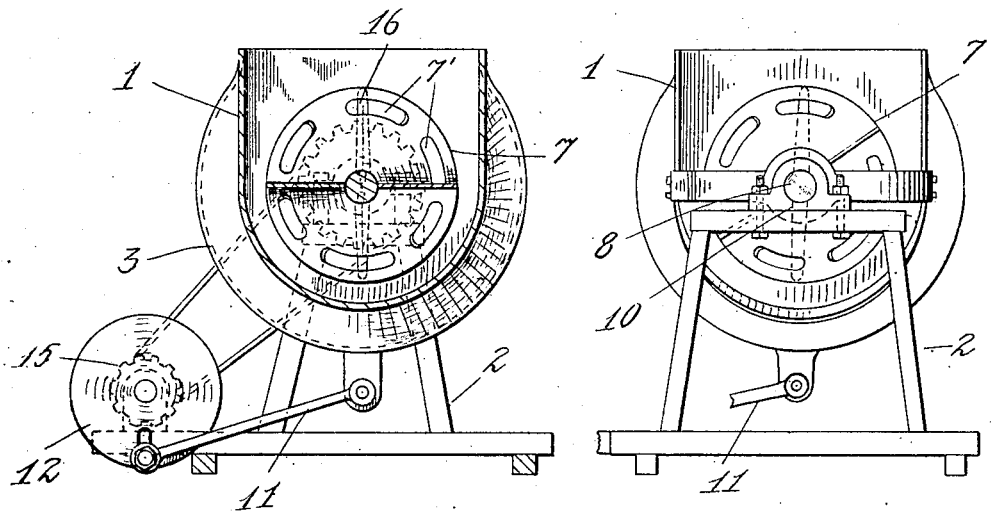
Fig. 2  Fig. 3
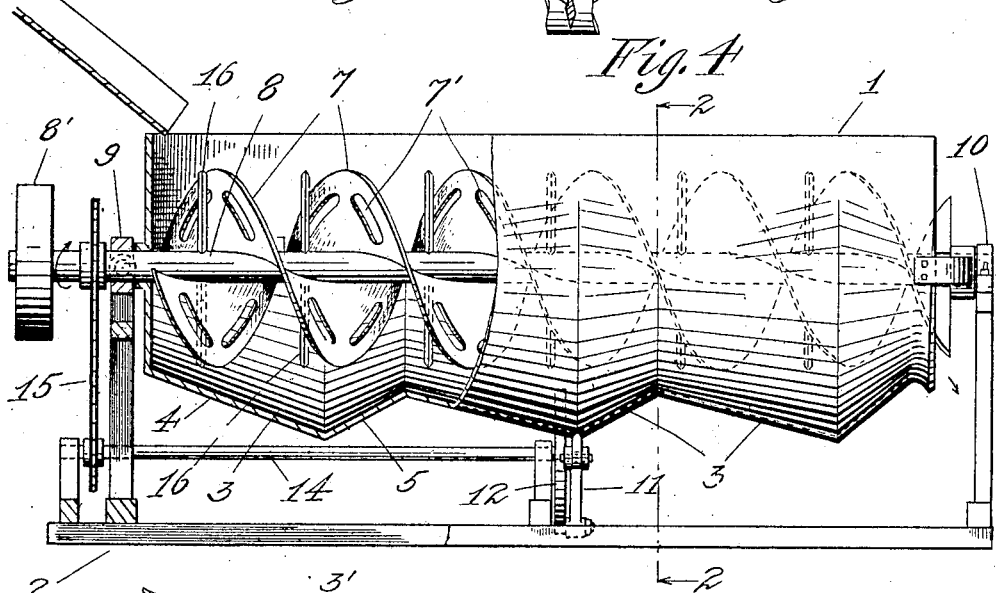
Fig. 4
Fig. 1
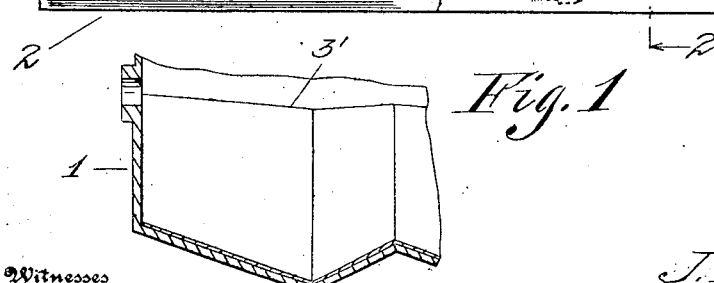
Fig. 5
Witnesses
Edward W. Cressman
Arleta Adams
Inventor
J. E. Doggwyler
By Adams & Brooks
Attorneys

UNITED STATES PATENT OFFICE.

JACOB E. DOGGWYLER, OF SEATTLE, WASHINGTON.

CONCENTRATOR.

No. 878,363.  Specification of Letters Patent.  Patented Feb. 4, 1908.

Application filed July 10, 1906. Serial No. 325,538.

*To all whom it may concern:*

Be it known that I, JACOB E. DOGGWYLER, a citizen of Switzerland, and a resident of the city of Seattle, in the county of King and State of Washington, have invented certain new and useful Improvements in Concentrators, of which the following is a specification.

The object of my invention is to provide a simple and efficient device to facilitate the separation of gold or other precious metals from the earth or gangue with which they are combined.

With the above object in view the invention resides in the construction, combination and arrangement of parts as set forth in this specification and defined in the appended claims.

In the accompanying drawing, wherein like reference characters designate corresponding parts throughout the several views: Figure 1 is a side view in partial section illustrating one form of embodiment of the invention capable of carrying the same into practical operation. Fig. 2 is a transverse section on line 2—2 of Fig. 1. Fig. 3 is an end elevation of the apparatus viewed from the tail end, parts being removed. Fig. 4 is a fragmentary view showing a detail, and Fig. 5 is a fragmentary sectional view showing a modification.

With reference to the drawing, numeral 1 designates a pan or receptacle for the material to be treated, and 2 indicates a suitable frame in which the pan is supported for movement as will be later understood.

In the construction shown the pan or receptacle 1 is of elongated form and provided in its wall with a series of pockets or recesses 3 substantially V-shaped in cross section spaced apart in the direction of its length, formed by bending outwardly said wall. The said pan or receptacle between contiguous pockets or recesses, is substantially U-shape in cross-section and at one end it is open for discharge of the tailings. The pockets or recesses 3 extend about the bottom portion of the pan and well upwardly at each side thereof, the end portions of the walls 4 and 5 of said pockets being curved inwardly and terminating at points below the top of said pan, as shown. Walls 4 and 5, the former of which is broader than the latter, flare outwardly in relatively opposite directions.

In connection with the pan or receptacle I provide a means for engaging the materials deposited therein to promote separation of the particles thereof which are of greater density from those of lesser density and to move the latter for discharge. The said means, as shown, comprising a plurality of comparatively broad helical blades 7 extending about a core or shank 8, which is disposed longitudinally of the pan or receptacle and supported for rotation in bearings as 9 and 10 mounted on frame 2. The core or shank 8 fits rotatably in suitable hubs provided on the end portions of the pan or receptacle 1, as clearly shown, and thereby serves to support the latter for reciprocatory movement about the blades 7, the said movement being conveniently imparted to the pan or receptacle by means of a rod 11 pivotally connected therewith and a crank 12 engaging said rod and secured to a shaft 14, which is journaled on frame 2 and connected with the core or shank 8 for rotation by means of suitable gearing, as 15.

Reference numeral 16 designates breakers which are provided to insure a more perfect disentegration of the materials. These breakers, as now considered, are in the form of fingers secured to the core or shank 8 and projecting outwardly therefrom.

In operation, the materials to be treated are fed into the pan at its head end either with water or in a dry state, the said pan being reciprocated so as to agitate the materials and force them against the revolving helical blades, rotated by power applied to pulley 8′, which carry all except the heavier particles, which fall back therefrom, over into the next pocket. This operation continues with respect to the material conveyed to the succeeding pockets, as is obvious. Blades 7 are preferably formed with openings, as 7′, so that they will be prevented, to a marked degree, from carrying off the water with the tailings, this being particularly desirable where there is a scarcity of water, under which condition the apparatus is operated, with its tail end elevated.

In Fig. 5 the pan 1 is provided with amalgamated plates, as 3′ which may be employed in treating pulverized ore.

Having thus described my invention what I claim as new, and desire to secure by Letters Patent of the United States of America, is:—

An apparatus of the character described comprising a pan substantially U-shape in cross section, formed in its wall with pockets substantially V-shape in cross section, the alternating walls of said pockets being longer than the others, said pockets extending about the bottom of said pan and well upwardly at each side thereof and having the end portions of their walls curved inwardly and terminating at points below the top of said pan, means supporting said pan for reciprocation, and a helical blade mounted for rotation in said pan and extending over the pockets thereof, as specified.

Signed at Seattle, Washington, this 29 day of June, 1906.

JACOB E. DOGGWYLER.

Witnesses:
 S. D. WINGATE,
 A. R. GARDNER.